United States Patent Office 2,922,819
Patented Jan. 26, 1960

2,922,819

O-PHENYLENE-BIS-(DIALKYLPHOSPHINES)

Joseph Chatt, St. Albans, Frank Alan Hart, Welwyn Garden City, and Harold Crosbie Fielding, Northwich, England, assignors to Imperial Chemical Industries Limited, London, England, a corporation of Great Britain No Drawing. Application March 5, 1959
Serial No. 797,336

Claims priority, application Great Britain March 14, 1958

4 Claims. (Cl. 260—606.5)

This invention relates to new organic diphosphines and to a new process for their manufacture.

Di-tertiary phosphines in which the phosphorus atoms are linked through a chain of two or more carbon atoms forming part of an aromatic ring are known in substituted form, for example 4-methyl-o-phenylene bis-(diethylphosphine), but the simple unsubstituted di-tertiary phosphines have not been prepared hitherto.

It is one object of the present invention to provide o-phenylene bis-(dialkylphosphines) as new products. It is a further object of the invention to provide a process for making these diphosphines, and derivatives thereof.

According to our invention we provide o-phenylene bis-(dialkylphosphines) as new forms of matter; we also provide a process for making them in which an o-halolithiobenzene or a derivative thereof is mixed with a tetralkyldiphosphine in an inert atmosphere at a low temperature of the order of −120° C. and the mixture allowed to warm up to room temperature.

The mechanism of the reaction of this process is as yet not fully understood. One possibility is that an unstable benzyne intermediate product is formed from the o-halolithiobenzene as the latter is warmed up from about −120° C. to about −50° C., and reacts with the tetra-alkyldiphosphine. If this postulated intermediate is formed in the absence of another reactive substance it condenses with itself to give diphenylene. Thus it cannot be formed separately and treated as a reagent; consequently, for the purpose of the process of the present invention it is necessary for the tetraalkyldiphosphine to be present in the reaction mixture wherein the benzyne intermediate is to be formed. Benzyne was first postulated by Wittig (Naturwissenschaft 30, 696 (1942)) and regarded as having the structure

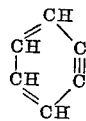

Examples of the part it plays in reaction mechanism have been given by Wittig and Pohmer (Angewandte Chemie, 67 348 (1955)), and by Gilman and Gorsich (J. Amer. Chem. Soc., 78, 2217 (1956)).

The process of our invention may thus be regarded as taking place in three stages which in the case of o-phenylene bis-(diethylphosphine) are as follows:

(i) o-Chlorobromobenzene reacts with butyl lithium at −120° C. to give o-chlorolithiobenzene and butyl bromide:

$$C_6H_4BrCl + C_4H_9Li \rightarrow C_6H_4ClLi + C_4H_9Br$$

(ii) o-Chlorolithiobenzene on warming to −60° C. changes over into benzyne and lithium chloride rapidly as the higher temperature is reached

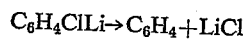

(iii) Tetraethylidiphosphine when added at the lower temperature to the o-chlorolithiobenzene and the mixture allowed to warm to −60° C. reacts with benzyne as the latter is formed:

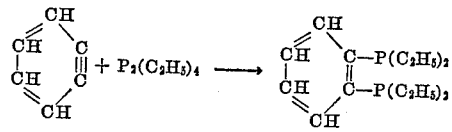

Examples of o-phenylene bis-(dialkylphosphines) are o-phenylene bis-(diethylphosphine); o-phenylene bis-(dimethylphosphine); o-phenylene bis-(diisopropylphosphine); examples of derivatives of o-phenylene bis-(dialkylphosphines) that can be made by the process of our invention are 4-methyl o-phenylene bis-(diethylphosphine); 4-dimethyl amino o-phenylene bis-(diethylphosphine); 4-methoxy o-phenylene bis-(diethylphosphine).

The preparation of o-phenylene bis-(diethylphosphine) described below illustrates, but does not restrict, the scope of our invention.

The o-phenylene bis-(dialkylphosphines) of our invention have useful properties based on their power to co-ordinate with metals. For example palladium or palladium black reacts with o-phenylene bis-(diethylphosphine) in an inert atmosphere to give a co-ordination compound from which the metal may be obtained in a pure state by heating. Finely divided cobalt obtained by reduction of cobaltous chloride reacts in a similar way. By carefully heating thin layers of these metal co-ordination compounds supported on inert materials such as glass, porcelain, silica, alumina, in a non-oxidising atmosphere it is possible to prepare mirrors whose reflecting surfaces are composed of the metal.

*Example*

The reaction was carried out in an atmosphere of nitrogen. A solution of o-bromochlorobenzene (39.3 gm.) in ether (200 cc.) in a 1½ litre flask fitted with a stirrer, nitrogen by-pass, inlet tube, and thermometer, was cooled to −120° C. by partial immersion in a bath of liquid nitrogen. To this stirred solution was added during 20 minutes a solution of n-butyl lithium (1 mol.) in petrol (40–60° fraction, 438 cc.) and ether (400 cc.); the butyl lithium solution was cooled to −120° C. before addition. After a further 15 mins. stirring, still at −120° C., a solution of tetraethyldiphosphine (36.6 gm., 1 mol.) in ether (100 cc.) at −120° C. was added during 10 mins. with stirring. The solution was now allowed to warm to room temperature during about 30 mins., during which time the solution, originally nearly colourless, turned dark red. After extraction with cold water, the organic layer was separated, the solvent removed from it, and the residue distilled, giving 10.7 g. crude diphosphine, B.P. 90–110°/0.2 mm. This fraction gave 7.7 gm. diphosphine (yield 15%) B.P. 103°/0.13 mm.

What we claim is:

1. o-Phenylene bis-(dialkylphosphines) having the general formula

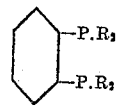

where R represents an alkyl group.

2. o-Phenylene bis-(diethylphosphine).

3. Process for making o-phenylene bis-(dialkylphosphines) comprising reacting an o-halolithiobenzene with a tetralkyldiphosphine in an inert atmosphere at a low temperature of the order of −120° C. and thereafter allowing the reaction mixture to warm up gradually to room temperature.

4. Process for making o-phenylene bis-(diethylphosphine) comprising reacting o-chlorolithiobenzene with tetraethyldiphosphine in an inert atmosphere at about −120° C. and thereafter allowing the reaction mixture to warm up to room temperature.

No references cited.